(No Model.)  5 Sheets—Sheet 1.

H. J. HAIGHT.
MEANS FOR THE TRANSMISSION OF METEOROLOGICAL INDICATIONS.

No. 442,881.  Patented Dec. 16, 1890.

Witnesses
Jas. S. Latimer
Carleton E. Snell

Inventor
Henry J. Haight
By his Attorney
Arthur F. Brown (No Model.) 5 Sheets—Sheet 2.

H. J. HAIGHT.
MEANS FOR THE TRANSMISSION OF METEOROLOGICAL INDICATIONS.
No. 442,881. Patented Dec. 16, 1890.

Witnesses
Jos. S. Latimer
Carleton E. Snell

Inventor
Henry J. Haight
By his Attorney
Arthur N. Browne (No Model.) 5 Sheets—Sheet 3.
H. J. HAIGHT.
MEANS FOR THE TRANSMISSION OF METEOROLOGICAL INDICATIONS.

No. 442,881. Patented Dec. 16, 1890.

Witnesses
Jos. S. Latimer
Carleton E. Snell.

Inventor
Henry J. Haight
By his Attorney
Arthur T. Browne (No Model.)  5 Sheets—Sheet 4.
H. J. HAIGHT.
MEANS FOR THE TRANSMISSION OF METEOROLOGICAL INDICATIONS.
No. 442,881. Patented Dec. 16, 1890.
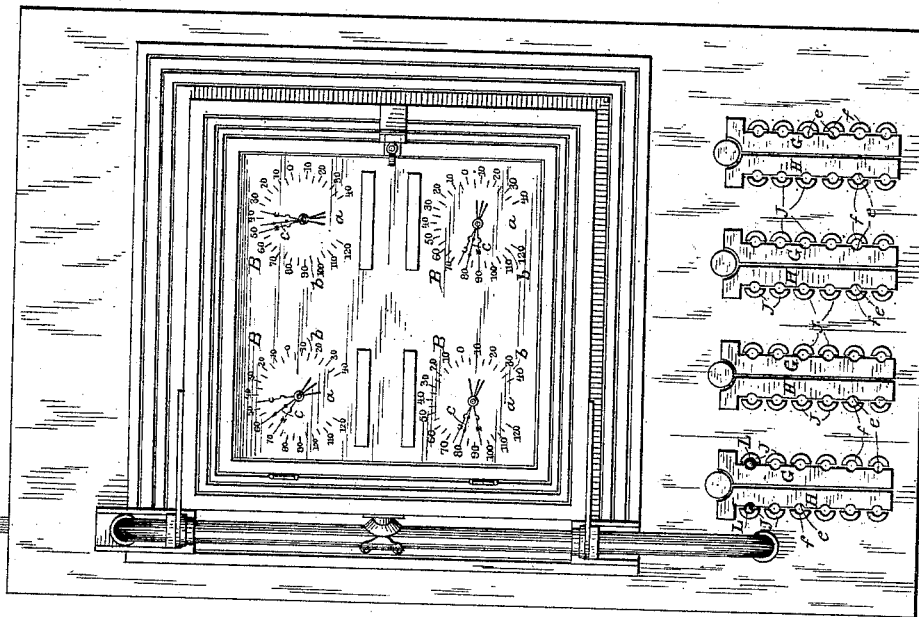
Fig. 5.
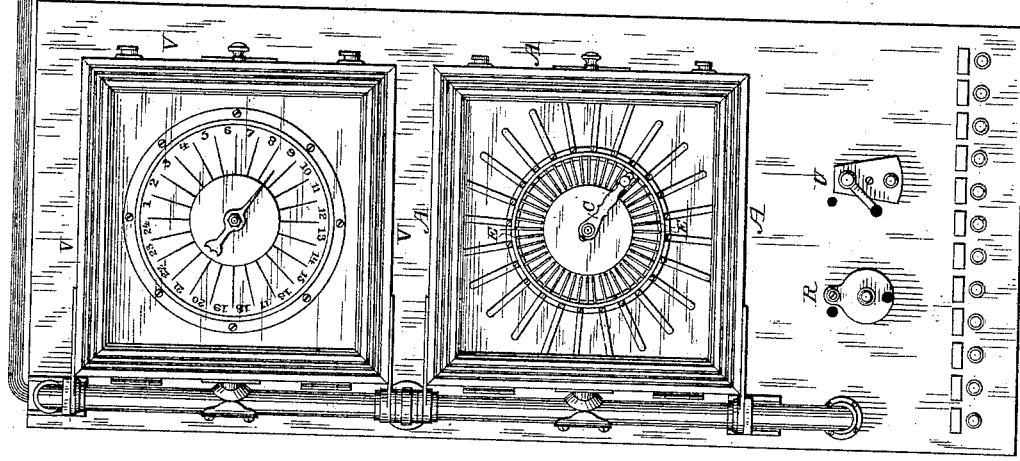
Witnesses
Jos. S. Latimer
Carleton E. Snell
Inventor
Henry J. Haight
By his Attorney
Arthur Browne

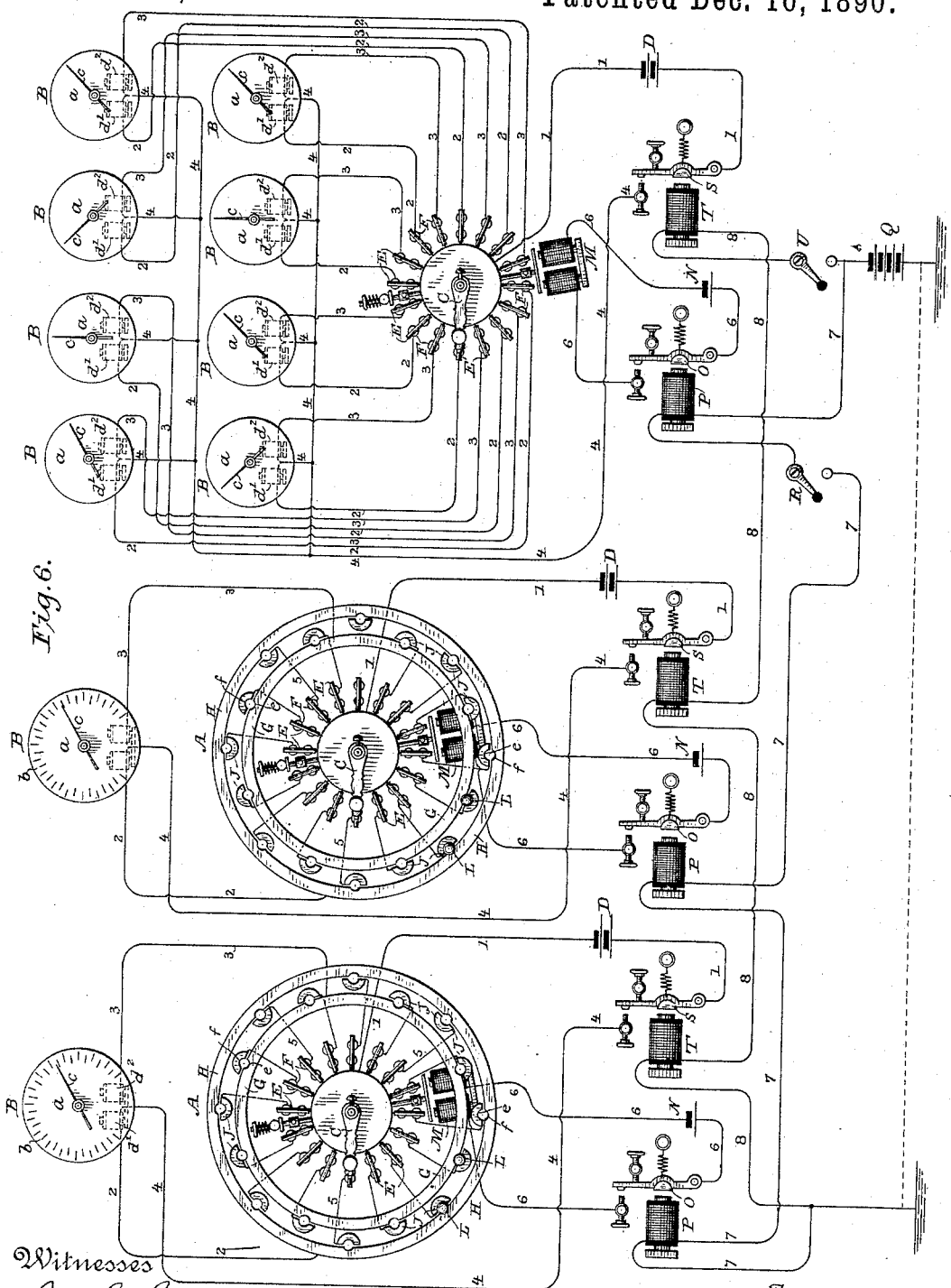

UNITED STATES PATENT OFFICE.

HENRY JANSEN HAIGHT, OF NEW YORK, N. Y.

MEANS FOR THE TRANSMISSION OF METEOROLOGICAL INDICATIONS.

SPECIFICATION forming part of Letters Patent No. 442,881, dated December 16, 1890.

Application filed November 29, 1889. Serial No. 331,925. (No model.)

*To all whom it may concern:*

Be it known that I, HENRY JANSEN HAIGHT, of the city, county, and State of New York, have invented certain new and useful Improvements in Means for the Transmission of Meteorological Indications, of which the following is a specification.

This invention relates to improvements upon the mechanisms and apparatus described in applications for Letters Patent, filed by me May 3, 1888, Serial No. 272,748, and March 27, 1889, Serial No. 305,010. In those applications is described apparatus for the transmission of meteorological indications from a main or central observatory to distant receiving-stations. In transmitting such indications there are employed electric receiving-indicators for indicating various meteorological conditions, and an apparatus, called by me a "multiple-transmitter," for bringing into electrical circuit successively the various indicating-instruments. As hitherto used by me it has been essential to employ at each station and at the main observatory as well as many indicating-instruments as there are indications to be reported, so that if six localities (for example) are to be recorded and four characters of meteorological conditions for each locality there would necessarily be twenty-four indicating-instruments at each station.

Now the object of the present invention is to reduce the number of indicating-instruments at the several stations; and the invention consists in the means employed for enabling a plurality of indications to be exhibited in succession upon indicating-instruments less in number than the number of the indications.

The present improvements are illustrated in the accompanying drawings, in which—

Figure 1:
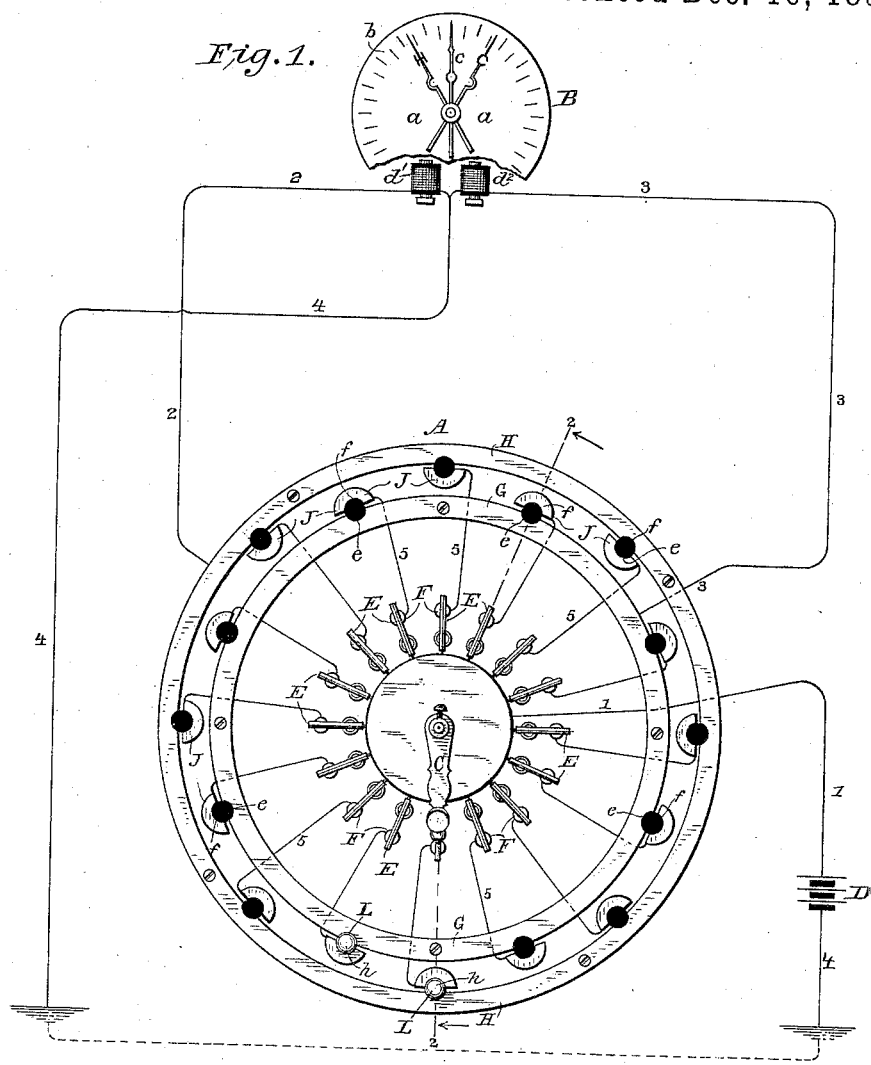
Figure 2:
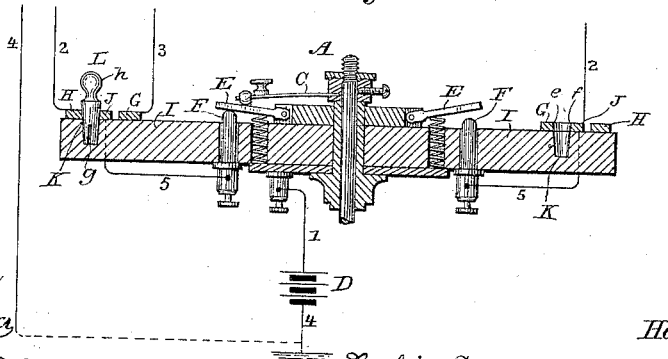
Figure 3:
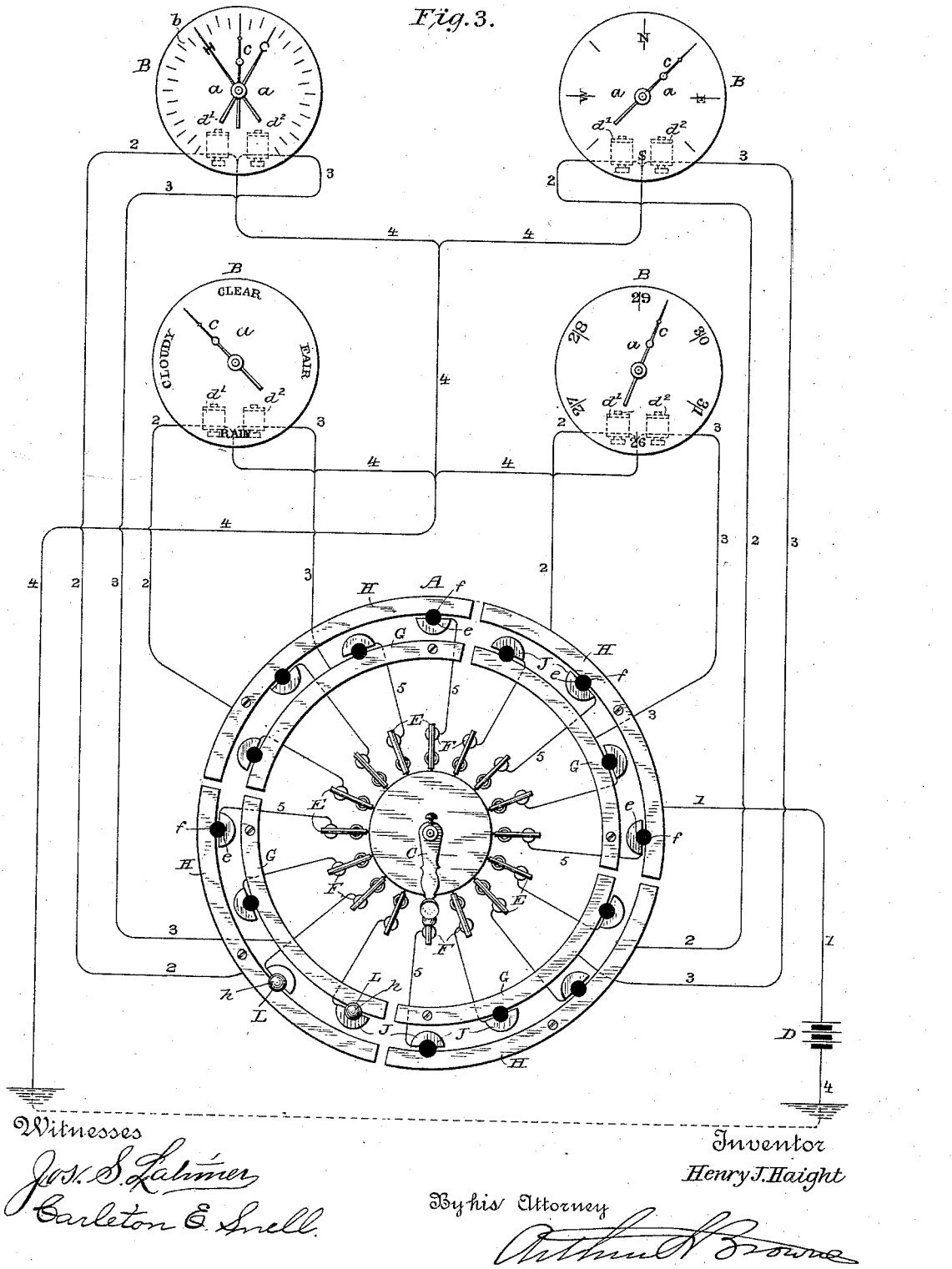
Figure 4:
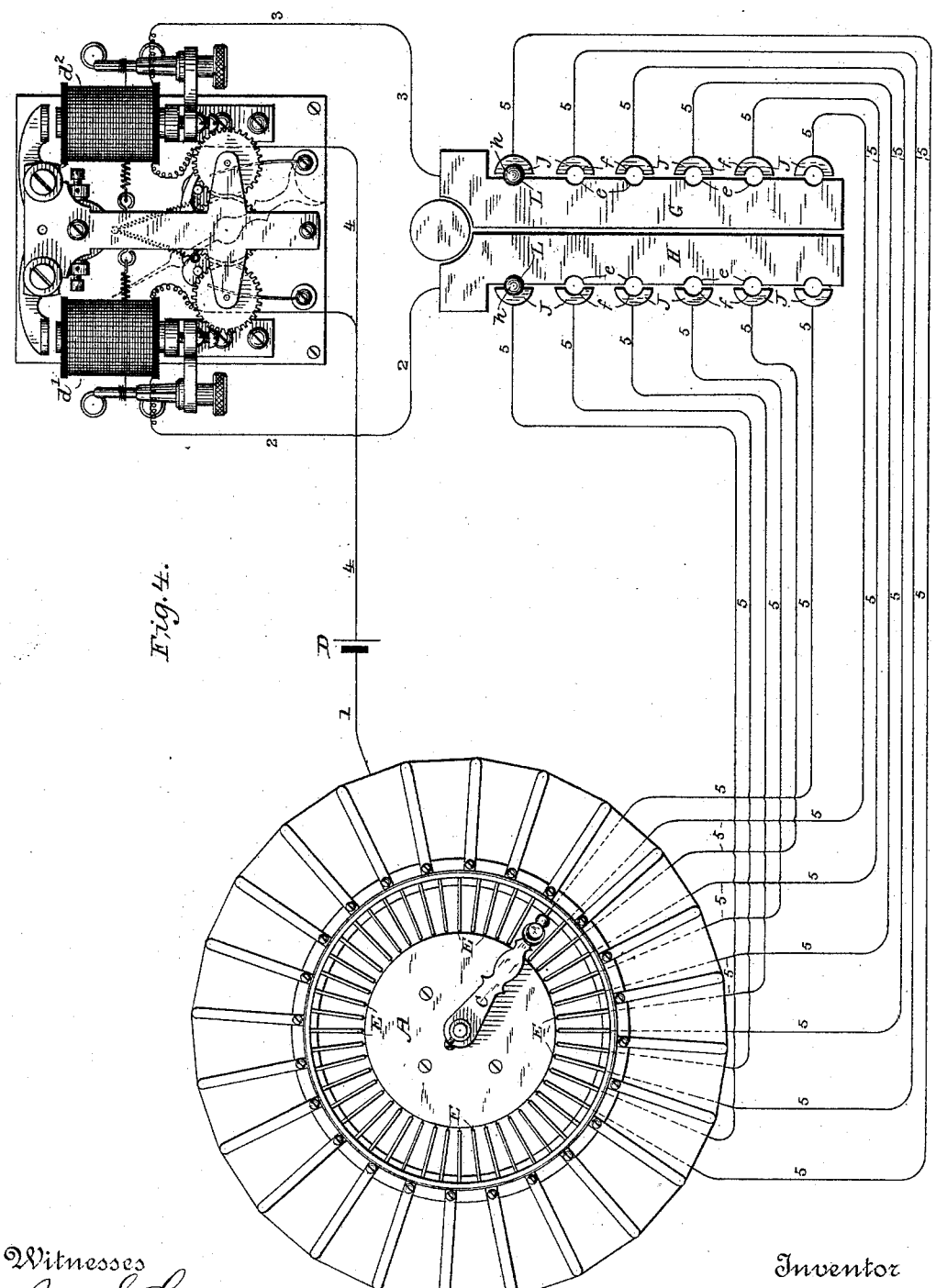

Figure 1 is a diagram illustrating the improvements in a simple form. Fig. 2 is a vertical section of the multiple-transmitter in a plane indicated by the line 2 2 in Fig. 1. Fig. 3 is a view in the nature of a diagram showing a modification. Fig. 4 is a view in the nature of a diagram showing a further modification. Fig. 5 is a plan view showing still another modification, and Fig. 6 is a diagram showing several connected stations provided with the improvements.

First will be described the apparatus as shown in Figs. 1 and 2. In these figures, A is the instrument called by me a "multiple transmitter," which is in all essential respects similar to that described in my application for Letters Patent filed May 3, 1888, Serial No. 972,748, and B is an electrical indicating-instrument.

The electrical indicating-instrument B is an instrument of well-known character and construction, in which there is an indicating-dial $a$, having a scale $b$, marked in accordance with the character of the meteorological conditions to be indicated thereby. For convenience the indicating-instruments shown, and which will be described, are such as are used for indicating temperature, and are known as "thermoscopes." The essential characteristics in all of the indicating-instruments are the same, the only differences being in the readings of the indicating-dials. In connection with the dial is a moving index $c$, which is adapted to be moved step by step in either direction, so as to indicate (in the case of a thermoscope) different degrees of temperature. This index is moved in opposite directions through well-known intermediate mechanism by the excitation of two electro-magnets $d'$ $d^2$. When one of these electro-magnets, as $d'$, is magnetized, the index $c$ is moved in one direction to indicate a higher or increasing temperature, and when the other magnet $d^2$ is excited the index is moved in the opposite direction to indicate a lower or decreasing temperature. This instrument is of well-known character, and hence only its essential characteristics are herein referred to, there being no novelty claimed in the instrument itself.

The multiple transmitter A in its general construction and operation possesses no novelty, except as hereinafter set forth. This multiple transmitter, as described in my application for Letters Patent, Serial No. 272,748, above referred to, comprises a movable circuit breaking and closing arm C. This circuit breaking and closing arm C is adapted to be given a step-by-step rotation by means of a clock-work mechanism controlled by an electric circuit, as described in my application above referred to. The essential characteristic feature of this arm is that it can be moved step by step and is under the control of an operator. This arm co-operates with a series of spring-upheld circuit-closing bars E E, arranged radially around the axis of the arm, each of which is brought into metallic contact with a fixed electric contact or electrode F when the arm C presses upon it. The several bars E E are all in constant and permanent electrical connection with one pole of a battery D by means of a wire 1. The multiple transmitter thus comprises a plurality of fixed contacts or electrodes and a circuit-closer having a step-by-step movement and adapted to bring said fixed contacts or electrodes one by one into electric connection with one pole of an electric generator. The multiple transmitter as thus far described possesses no novelty in itself, and is the same as that described in my above-mentioned applications for Letters Patent.

The purpose and object of the multiple transmitters in connection with the electrical indicating-instruments are fully set forth in the above-named applications, but will here be briefly recapitulated in order to render clear the present improvements. The instruments may be adapted for the indication of any character of information capable of being rendered intelligible by index movements. It will be assumed, however, for the purpose of illustration that temperature records are to be transmitted from a transmitting-station to a receiving-station. In accordance with said applications there is employed at each station one multiple transmitter and as many thermoscopes for indicating temperature as there are separate temperature records to be transmitted—that is, if it were desired to transmit the temperature records of four localities there would be at each station four thermoscopes, each properly labeled or otherwise set apart for one of the localities. The four thermoscopes at each station are connected with the multiple transmitter thereof, so that each thermoscope can be brought in turn into electric communication with a local battery by the operation of the multiple transmitter. The multiple transmitters of the two stations are electrically connected with each other, so that their circuit making and breaking arms C may be moved in unison by an electric switch or key at the transmitting-station. Consequently when a particular thermoscope at the receiving-station is in operative relation with the multiple transmitter at the transmitting-station the corresponding thermoscope at the receiving-station is also in operative relation with the multiple transmitter at the receiving-station. The local circuits at both stations (in which the thermoscopes are located) are opened and closed by relay-magnets, and these relay-magnets at both stations are located in an electric circuit controllable at the transmitting-station by a suitable switch or key. Consequently after the proper corresponding thermoscopes at the two stations are brought into operative relation with the respective local batteries they are operated in unison by the operator at the transmitting-station. The thermoscope at the transmitting-station is in full sight of the operator, and he manipulates the proper switch or key until he observes that the thermoscope indicates the proper temperature record which was to be transmitted. He then stops his manipulation, and the corresponding thermoscope at the receiving-station (its index having moved in unison with that of the thermoscope of the transmitting-station) then indicates the proper temperature record, so that an inspection of the same at the receiving-station is all that is necessary on the part of a person desiring to be informed concerning the temperature of that particular locality.

As the multiple transmitter has hitherto been employed, each fixed electrode F has been connected with one of the magnets $d'$ $d^2$ of a thermoscope or other indicating-instrument, and consequently it has been necessary to employ one-half as many thermoscopes or other indicating-instruments as there are fixed electrodes F on the multiple transmitter. The number of the electrodes F is determined by the number of localities which are to be reported, so that it has been hitherto necessary to employ at each station as many separate thermoscopes as there are localities to be reported.

To reduce the number of thermoscopes or other indicating-instruments is the object of the present invention, and, as illustrated in Fig. 1, it is possible to employ a single thermoscope with a multiple transmitter having an indefinite number of electrodes F.

In accordance with the present invention, there are added to the multiple transmitter two fixed metallic strips G and H, which are arranged, as shown in Fig. 1, as annular rings concentric with each other and with the axis of the arm C, and which are suitably insulated from each other and from the electrodes F. The insulation may be effected by mounting all of the metallic parts on a suitable wooden base or support I. One of these metallic strips, as H, is connected by a wire 2 with the magnet $d'$ of the indicating-instrument, which moves the index $c$ to the left, (or, in the case of a thermoscope, to successively higher degrees,) and the other metallic strip, as G, is connected by a wire 3 to the magnet $d^2$, which moves the index of the indicating-instrument to the right, (or, in the case of a thermoscope, to successively lower degrees.) Both magnets $d'$ $d^2$ of the indicating instrument are connected by a return-wire 4 to the pole of the battery D opposite to that to which the multiple-transmitter arm or circuit-closer C is connected by the wire 1. A portion of the circuit of the return-wire 4 may be through the earth.

Now it is obvious that the electric circuits can be closed only by connecting the electrodes F with the metallic strips G or H. Between the two metallic strips there is an annular space in which there are fixed a series of contact-plates J J, corresponding in number with the number of the electrodes F, and these plates J J are connected to the electrodes F, respectively, by means of wires 5 5. The inner circular strip G has on its outer edge a series of curved notches $e$ $e$, and the outer strip H has on its inner edge a series of corresponding notches $e$ $e$. The several contact-plates are located opposite these notches $e$ $e$ on both of the annular strips, and each contact-plate has a similar curved notch $f$. The notches $f f$ on the several contact-plates are, however, arranged alternately, so that one-half of the contact-plates have their notches opposite to the notches on the strip G, whereas the alternate contact-plates have their notches opposite to the notches on the strip H. The insulating base or support I is provided with a series of holes K K, immediately beneath the notches $e$ and $f$ of the annular strips and the contact-plates J.

In order to make electric contact between any one of the contact-plates and one of the annular strips, a movable circuit-closer L is employed. This movable circuit-closer consists in a pin which is made of suitable conducting material (such as brass) and is split at its lower end, as shown at $g$, so as to be somewhat elastic. The pin is provided with a manipulating-head $h$. In order to make contact between any one of the contact-plates and the particular annular strip to which it is adapted, the circuit-closing pin L is inserted into the hole K in such manner that the outer surface of the pin is brought into close electrical contact with both the contact-plate and the annular strip. By means, therefore, of this movable circuit-closer electrical contact can be made between any one of the contact-plates and the metallic strip to which it is adapted. If, then, the removable circuit-closing pin is placed in the proper aperture, so as to be in contact with that contact-plate J which is connected by wire 5 with that electrode F over which the arm C is in position, then an electric circuit will be closed through the indicating-instrument or thermoscope B and the battery D. When the removable circuit-closing pin is thus in position—say between one of the plates J and the outer strip H—the electric current passes from the battery D through the wire 1 to the pivoted bar E, which is depressed by the arm C, electrode F, wire 5, contact-plate J, removable pin L, annular strip H, wire 2, through the magnet $d'$, which moves the index $c$ of the thermoscope to indicate higher temperature, and then through the return-wire 4 to the opposite pole of the battery D, thus completing the electric circuit, exciting the magnet $d'$ of the thermoscope, and moving the index thereof one step to the left. In a similar manner, whatever position the arm C may be in, the proper electric circuit can be closed by placing the removable circuit-closer in the proper corresponding aperture K.

The several electrodes F of the multiple transmitter are designated beforehand, so as to indicate the various localities which are to be reported, so that, if (for example) the instrument should be used to transmit information concerning a temperature at Buffalo higher than that indicated by the thermoscope in its state of rest, then one particular electrode F would be permanently marked to indicate increasing temperatures at Buffalo. Then when it should be desired to have the thermoscope indicate such temperature at Buffalo the arm C would be moved to the proper bar E and electrode F and the removable circuit-closing pin would be put in the proper corresponding aperture K. This would close the circuit through the increasing-temperature Buffalo contact, and through the magnet $d'$ of the thermoscope, which is used to move the index $c$ of the thermoscope to the left.

It is of course to be understood that the object of the removable circuit-closing pin and of the arm C is merely to determine which particular circuit is to be brought into connection with the battery. When this circuit is in operation, then the index $c$ of the thermoscope may be moved any number of steps in the direction determined by which of the two magnets $d'$ or $d^2$ is in circuit by making and breaking the circuit the proper number of times. This making and breaking of the circuit the proper number of times may be done by repeatedly removing and inserting the removable circuit-closing pin L out of and into the aperture K, or preferably by an independent key or switch, as hereinafter described.

In order to facilitate making connection between the multiple transmitter and the thermoscope, it is desirable to use two of the circuit-closers L L, so that both of the two magnets $d'$ $d^2$ of the thermoscope may be electrically connected at the same time with two adjacent contact-plates J J, which are connected with two adjacent electrodes F F, selected for the indications of a single locality. When the two circuit-closers are thus employed, the index $c$ of the thermoscopes will be ready to be moved in either direction, according as may be determined by the arm C.

The modification shown in Fig. 3 is in all substantial respects the same as the arrangement shown in Fig. 1, except that there are four indicating-instruments, instead of one, connected with a single multiple transmitter. In this case accordingly there are as many pairs of metallic strips G H as there are indicating-instruments, and these strips are shown as segments of a circle. This arrangement is a convenient one where the several indicating-instruments are employed for indicating different meteorological phenomena, and it also indicates that the invention is not necessarily limited to the use of a single indicating-instrument.

In the modification shown in Fig. 4 the means for controlling the circuits is substantially the same as in Figs. 1 and 3, except that the contact-plates J are not located on the multiple transmitter itself, and the co-acting annular strips are replaced by straight metallic strips G and H, which are respectively in electrical connection with the two magnets $d'$ and $d^2$ of the indicating-instrument. The operation is, however, essentially the same. In this figure also the mechanical construction of the indicating-instrument is more fully illustrated; but no claim is made upon the same.

The essential feature of the present invention is thus seen to be a series of fixed contact-plates in permanent electrical connection with the several electrodes of the multiple transmitter, and two metallic strips in permanent electrical connection with the two magnets, respectively, of an indicating-instrument, one metallic strip being in co-operative relation with one half of the contact-plates, and the other strip being in co-operative relation with the other half of the contact-plates. In both cases the circuits are completed by means of movable circuit-closers.

In Fig. 5 are shown the two cases, one containing the multiple transmitter A and the verifier V, (such as are described in my above-mentioned application, Serial No. 272,748, and the construction of which constitutes no part of the present invention,) and the other case containing four indicating-instruments. Beneath the indicating-instruments are shown four sets of contact-plates J J and metallic strips G H for making and breaking the several electrical circuits.

Fig. 6 is a diagram showing a plurality of distant stations equipped with the instruments, as illustrated in Fig. 1, for the purpose of showing their connection with each other. The system of electric connection is substantially the same as that illustrated and described in my above-entitled applications. In this figure the station at the right is the main or transmitting station, and the other two stations are local receiving-stations. The multiple transmitters A shown are capable of transmitting the thermometric indications of eight localities only. At the main transmitting-station there are shown eight indicating-instruments or thermoscopes B, or one for each locality to be reported, whereas the other two stations are equipped with the present improvements.

M is the usual escapement-magnet of each multiple transmitter, which controls the clockwork which actuates the arm C step by step in a well-known way. Each magnet M is in a local circuit 6, having a local battery N, and controlled by the armature O of a relay-magnet P. The relay-magnets P at all of the stations are arranged in series in a circuit 7, having a battery Q. The return of circuit 7 may be through the earth. The circuit 7 is opened and closed by a key R at the main station. The opening and closing of key R alternately magnetizes and demagnetizes the relays P, which in turn simultaneously make and break the local circuits 6, and so operate the arms C C of the several multiple transmitters uniformly, so that they may be all brought to any desired point by the operator at the main office.

At each station the return-circuit wire 4 between the indicating instrument or instruments and the battery D is broken and is controlled by the armature S of a relay-magnet T. The several relays T at all the stations are arranged in series in a circuit 8, having a battery Q. This circuit is opened and closed by a key U at the main station. The manipulation of this key U thus alternately makes and breaks the several local circuits in which the batteries D are located at the several stations. This method of controlling the several local circuits at the main station is not new, being fully described in my aforesaid applications.

The arms C of the multiple transmitters at the local stations are wholly controlled by the attendant at the main station. If a party at a local station wishes to be informed concerning the temperature at a given locality provided for by the system, he watches the arm C on his multiple transmitter until it moves to the proper point. The time for the transmission may be determined beforehand and fixed once for all. He then places his two circuit-closing pins in the proper apertures K K, thus bringing his indicating-instrument into an active circuit controlled by the battery D and the relay-magnet T.

I claim as my invention—

1. A multiple transmitter comprising a plurality of fixed contacts or electrodes and a circuit-closer having a step-by-step movement and adapted to bring said fixed contacts or electrodes one by one into electrical connection with one pole of an electric generator, and an indicating-instrument having a movable index and two magnets controlling the same, said magnets being in electrical connection with the opposite pole of said battery, in combination with two metallic strips in electrical connection with said magnets, respectively, contact-plates in electric connection with said fixed electrodes of said multiple transmitter, a portion of said contact-plates co-operating with one of said metallic strips and a portion of said contact-plates co-operating with the other metallic strip, and movable circuit-closers for establishing electric connection between said contact-plates and said metallic strips, substantially as set forth.

2. A multiple transmitter comprising a plurality of fixed contacts or electrodes and a circuit-closer having a step-by-step movement and adapted to bring said fixed contacts or electrodes one by one into electric connection with one pole of an electric generator, and an indicating-instrument having a movable index and two magnets controlling the same, said magnets being in electrical connection with the opposite pole of said battery, in combination with two metallic strips in electrical connection with said magnets, respectively, contact-plates in electrical connection with said fixed electrodes of said multiple transmitter, a portion of said contact-plates co-operating with one of said metallic strips and a portion of said contact-plates co-operating with the other metallic strip, said metallic strips and their co-operating contact-plates having their adjacent edges notched or recessed, the insulating-base on which said contact-plates and strips are mounted, said base having apertures behind said notches or recesses, and a circuit-closing metallic pin adapted to be inserted in any one of said apertures and thus be brought into simultaneous contact with said contact, with one of said metallic strips, and with one of its co-operating contact-plates, substantially as set forth.

3. A multiple transmitter comprising a plurality of fixed contacts or electrodes and a circuit-closer having a step-by-step movement and adapted to bring said fixed contacts or electrodes one by one into electric connection with one pole of an electric generator, and an indicating-instrument having a movable index and two magnets controlling the same, said magnets being in electrical connection with the opposite pole of said battery, in combination with two metallic strips in electric connection with said magnets, respectively, and mounted on said multiple transmitter, contact-plates mounted on said multiple transmitter and in electric connection with said fixed electrodes of said multiple transmitter, one half of said contact-plates co-operating with one of said metallic strips and the other half of said contact-plates co-operating with the other metallic strip, and movable circuit-closers for establishing electric connection between said contact-plates and said metallic strips, substantially as set forth.

In witness whereof I have hereunto signed my name in the presence of two subscribing witnesses.

HENRY JANSEN HAIGHT.

Witnesses:
C. S. NEWELL,
ARTHUR S. BROWNE.